United States Patent
Koskela et al.

(10) Patent No.: US 11,343,722 B2
(45) Date of Patent: May 24, 2022

(54) MANAGEMENT OF HANDOVER CANDIDATE CELLS

(71) Applicant: Nokia Technologies Oy, Espoo (FI)

(72) Inventors: Timo Koskela, Oulu (FI); Mikko Säily, Laukkoski (FI); Ingo Viering, Munich (DE); Tommi Jokela, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 99 days.

(21) Appl. No.: 16/496,554

(22) PCT Filed: Feb. 5, 2018

(86) PCT No.: PCT/FI2018/050079
§ 371 (c)(1),
(2) Date: Sep. 23, 2019

(87) PCT Pub. No.: WO2018/172600
PCT Pub. Date: Sep. 27, 2018

(65) Prior Publication Data
US 2021/0120458 A1    Apr. 22, 2021

Related U.S. Application Data

(60) Provisional application No. 62/475,649, filed on Mar. 23, 2017.

(51) Int. Cl.
*H04W 36/00* (2009.01)
*H04W 76/11* (2018.01)

(52) U.S. Cl.
CPC ........... *H04W 36/0016* (2013.01); *H04W 36/0061* (2013.01); *H04W 36/00837* (2018.08); *H04W 76/11* (2018.02)

(58) Field of Classification Search
CPC ....... H04W 36/0016; H04W 36/00837; H04W 36/0061; H04W 76/11
See application file for complete search history.

(56) References Cited

U.S. PATENT DOCUMENTS

2012/0196602 A1*  8/2012  Grob-Lipski ... H04W 36/00835
                                                  455/436
2014/0023045 A1*  1/2014  Li ..................... H04W 36/0055
                                                  370/331

(Continued)

FOREIGN PATENT DOCUMENTS

EP         2696624 A1    2/2014
WO    2014/089051 A1    6/2014

(Continued)

OTHER PUBLICATIONS

"IMT Vision—Framework and Overall Objectives of the Future Development of IMT for 2020 and Beyond", M Series Mobile, radio determination, amateur and related satellite services, Recommendation ITU-R M.2083-0, Sep. 2015, 21 pages.

(Continued)

*Primary Examiner* — Dady Chery
(74) *Attorney, Agent, or Firm* — Squire Patton Boggs (US) LLP

(57) ABSTRACT

Various communication systems may benefit from improved handover. For example, it may be helpful to manage a list candidate cells to which a user equipment may be handed over. A method may include receiving at a user equipment a list of prepared candidate cells from a source cell. The method may also include transmitting the list of prepared candidate cells from the user equipment to a target cell after or during handover from the source cell to the target cell.

20 Claims, 5 Drawing Sheets

(56) References Cited

U.S. PATENT DOCUMENTS

| | | |
|---|---|---|
| 2014/0301368 A1 | 10/2014 | Chen et al. |
| 2019/0380067 A1* | 12/2019 | Rosa .................. H04W 36/0072 |

FOREIGN PATENT DOCUMENTS

| | | |
|---|---|---|
| WO | 2014/161576 A1 | 10/2014 |
| WO | 2015/144240 A1 | 10/2015 |
| WO | 2016/014203 A1 | 1/2016 |
| WO | 2016/130062 A1 | 8/2016 |
| WO | 2016/209553 A1 | 12/2016 |

OTHER PUBLICATIONS

"3rd Generation Partnership Project; Technical Specification Group Radio Access Network; Study on Scenarios and Requirements for Next Generation Access Technologies; (Release 14)", 3GPP TR 38.913 V14.1.0, Dec. 2016, pp. 1-38.

"Evaluation and Design Aspects for NR Mobility Enhancement", 3GPP TSG-RAN WG2 Meeting #96, R2-168852, Agenda item: 9.3.1.1.1, Samsung, Nov. 14-18, 2016, 11 pages.

"3rd Generation Partnership Project; Technical Specification Group Radio Access Network; Study on New Radio Access Technology; Radio Interface Protocol Aspects (Release 14)", 3GPP TR 38.804 V1.0.0, Mar. 2017, pp. 1-56.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.1.0, Dec. 2016, pp. 1-317.

"Discussion on Handover Procedure Optimization", 3GPP TSG-RAN2#97, R2-1700956, Agenda Item: 10.3.1.1.2, OPPO, Feb. 13-17, 2017, pp. 1-3.

"Further Consideration on Inter-cell HO Mechanism", 3GPP TSG-RAN WG2 Meeting #97, R2-1700985, Agenda Item: 10.3.1.1.2, CATT, Feb. 13-17, 2017, pp. 1-3.

"Introduction of UE Autonomous Mobility", 3GPP TSG-RAN WG2 Meeting # 97, R2-1701360, Agenda item: 10.3.1 1.2, Samsung, Feb. 13-17, 2017, 3 pages.

"Solutions for Single Connected Handover", 3GPP TSG-RAN WG2#97, R2-1701385, Agenda item: 10.3.1.1.2, ZTE, Feb. 13-17, 2017, 6 pages.

"Handover in Single Connectivity Scenario", 3GPP TSG-RAN WG2 #97, R2-1701798, Agenda Item: 10.3.1 1.2, Huawei, Feb. 13-17, 2017, 3 pages.

"NW Controlled Autonomous Handover in Single Connectivity", 3GPP TSG RAN WG2 Meeting #97, R2-1701711, Agenda item: 10.3.1.1.3, Intel Corporation, Feb. 13-17, 2017, pp. 1-4.

International Search Report and Written Opinion received for corresponding Patent Cooperation Treaty Application No. PCT/FI2018/050079, dated Apr. 24, 2018, 16 pages.

"Conditional Handover", 3GPP TSG-RAN WG2 #97, R2-1700864, Agenda Item: 10.3.1.1.2, Ericsson, Jan. 13-17, 2017, pp. 1-5.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.1.0, Dec. 2016, pp. 1-654.

Extended European Search Report received for corresponding European Patent Application No. 18771527.1, dated Dec. 4, 2020, 8 pages.

* cited by examiner

US 11,343,722 B2

MANAGEMENT OF HANDOVER CANDIDATE CELLS

RELATED APPLICATION

This application was originally filed as PCT Application No. PCT/FI2018/050079, filed on 5 Feb. 2018, which claims priority from U.S. Provisional Application No. 62/475,649, filed on 23 Mar. 2017.

BACKGROUND

Field

Various communication systems may benefit from improved handover. For example, it may be helpful to manage a list of candidate cells to achieve quicker handover.

Description of the Related Art

In conventional network controlled handovers in third generation partnership project (3GPP) technology, a user equipment is configured to take measurements of the environment in which the user equipment is located, and forward the measurements to the network. Based on the received measurements, the network may trigger a handover request to a target cell. Alternatively, the network may hand over the user equipment due to load balancing in view of the received measurements. The target cell may be operated at least on the same carrier frequency, on a different carrier frequency, or may be part of a different Radio Access Network (RAN).

The target cell can then perform admission control, and grant access to user equipment by sending a radio resource control (RRC) reconfiguration message via the source cell in which the user equipment is located. Once the user equipment receives the reconfiguration message, as part of a handover command, the user equipment reconfigures itself with target cell performance parameters, and accesses the target cell with the provided configuration.

User equipment based mobility has been associated with idle mode mobility. Newer 3GPP releases, however, introduce a new RAN controlled RRC state for low activity user equipment termed Light Connected in Long Term Evolution (LTE) technology and inactive in new radio (NR) technology, with both states using user equipment based mobility. While the Idle, Inactive, or Light Connected mode mobility seem like a user equipment based mobility, the Idle or Inactive mode are network assisted in the sense that the network configures the user equipment with certain parameters. The parameters, for example, are signal level thresholds and conditions for how the user equipment should select or re-select cells in the Idle or Inactive modes.

The conventional network based handover, described above, may fail as a result of the user equipment not being able to properly send RRC measurement reports to the source cell. Even if the user equipment manages to properly send the measurement reports, the user equipment may not successfully receive the handover command from the network. Both failures may occur as a result of degradation of the quality of service provided by the source cell, which can be one of the reasons for initially triggering of handover related action in both the network and the user equipment.

SUMMARY

According to certain embodiments, an apparatus may include at least one memory including computer program code, and at least one processor. The at least one memory and the computer program code may be configured, with the at least one processor, to cause the apparatus at least to receive a list of prepared candidate cells from a source cell. The at least one memory and the computer program code may also be configured, with the at least one processor, to cause the apparatus at least to transmit the list of prepared candidate cells to a target cell after or during handover from the source cell to the target cell.

A method, in certain embodiments, may include receiving at a user equipment a list of prepared candidate cells from a source cell. The method may also include transmitting the list of prepared candidate cells from the user equipment to a target cell after or during handover from the source cell to the target cell.

An apparatus, in certain embodiments, may include means for receiving a list of prepared candidate cells from a source cell. The apparatus may also include means for transmitting the list of prepared candidate cells to a target cell after or during handover from the source cell to the target cell.

According to certain embodiments, a non-transitory computer-readable medium encoding instructions that, when executed in hardware, perform a process. The process may include receiving at a user equipment a list of prepared candidate cells from a source cell. The process may also include transmitting the list of prepared candidate cells from the user equipment to a target cell after or during handover from the source cell to the target cell.

According to certain other embodiments, a computer program product may encode instructions for performing a process. The process may include receiving at a user equipment a list of prepared candidate cells from a source cell. The process may also include transmitting the list of prepared candidate cells from the user equipment to a target cell after or during handover from the source cell to the target cell.

According to certain embodiments, an apparatus may include at least one memory including computer program code, and at least one processor. The at least one memory and the computer program code may be configured, with the at least one processor, to cause the apparatus at least to receive in a target cell from a user equipment or a source network node a list of prepared candidate cells after the user equipment has been handed over to the target cell from the source cell.

A method, in certain embodiments, may include receiving at a network node in a target cell from a user equipment or a source network node a list of prepared candidate cells after the user equipment has been handed over to the target cell from the source cell.

An apparatus, in certain embodiments, may include means for receiving in a target cell from a user equipment or a source network node a list of prepared candidate cells after the user equipment has been handed over to the target cell from the source cell.

According to certain embodiments, a non-transitory computer-readable medium encoding instructions that, when executed in hardware, perform a process. The process may include receiving at a network node in a target cell from a user equipment or a source network node a list of prepared candidate cells after the user equipment has been handed over to the target cell from the source cell.

According to certain other embodiments, a computer program product may encode instructions for performing a process. The process may include receiving at a network node in a target cell from a user equipment or a source network node a list of prepared candidate cells after the user equipment has been handed over to the target cell from the source cell.

According to certain embodiments, an apparatus may include at least one memory including computer program code, and at least one processor. The at least one memory and the computer program code may be configured, with the at least one processor, to cause the apparatus at least to send a list of candidate cells to a user equipment, wherein the list of candidate may be transmitted to the target cell after or during handover of the user equipment from a source cell to the target cell.

A method, in certain embodiments, may include sending a list of candidate cells from a source cell to a user equipment, wherein the list of candidate may be transmitted to the target cell after or during handover of the user equipment from the source cell to the target cell.

An apparatus, in certain embodiments, may include means sending a list of candidate cells to a user equipment, wherein the list of candidate may be transmitted to the target cell after or during handover of the user equipment from a source cell to the target cell.

According to certain embodiments, a non-transitory computer-readable medium encoding instructions that, when executed in hardware, perform a process. The process may include sending a list of candidate cells from a source cell to a user equipment, wherein the list of candidate may be transmitted to the target cell after or during handover of the user equipment from the source cell to the target cell.

According to certain other embodiments, a computer program product may encode instructions for performing a process. The process may include sending a list of candidate cells from a source cell to a user equipment, wherein the list of candidate may be transmitted to the target cell after or during handover of the user equipment from the source cell to the target cell.

According to a first embodiment, a method may include undergoing a handover from a source cell to a target cell. The method may also include receiving a reject, accept, or modify message from the network node in the target cell after the handover relating to a list of prepared candidate cells associated with the user equipment. Further, the method may include deconfiguring, keeping, or modifying the list of prepared candidate cells depending on the received message from the network node.

According to a second embodiment, a method may include receiving at a user equipment a list of prepared candidate cells from a source cell. The method may also include transmitting the list of prepared candidate cells to a target cell after or during handover from the source cell to the target cell.

In a variant, the method may include transmitting from the user equipment to the network node in the target cell the list of prepared candidate cells after being handed over or as a part of handover signaling.

In an additional variant, the list of prepared candidate cells may include at least one of cell identification, user equipment identity for the candidate, or latest measurements associated with the candidate cells.

In a further variant, the list of prepared candidate cells may be transmitted from the user equipment to the network node in a dedicated radio resource control message or a radio resource control reconfiguration complete message.

In another variant, the handover of the user equipment may be triggered upon receiving of a network handover command or upon meeting a network configured condition in case of autonomous handover.

In an additional variant, when the user equipment receives the rejection message from the network node, the user equipment may deconfigure one or more cells the list of prepared candidate cells.

In another variant, the network node may be located in the target cell.

In a variant, the rejection message may include instructions for removal of handover conditions for a conditional handover.

In yet another variant, the when the user equipment receives the accept message from the network node, the user equipment may continue using the list of prepared candidate cell.

In an additional variant, when the user equipment receives the modify message from the network node, the user equipment may modify the list of prepared candidate cells based on the received modify message by at least one of removing or adding a cell to the list of prepared candidate cells.

In a further variant, at least one of the accept, reject, or modify message may include instructions for modification of handover conditions for autonomous handover.

In a variant, the method may include receiving a message at the user equipment from the source cell. The message may indicate to the user equipment whether the source cell may be added to the list of prepared candidate cells. The method may also include adding the source cell to the list of prepared candidate cells.

According to a third embodiment, a method may include receiving at a network node in a target cell from a user equipment or a source network node a list of prepared candidate cells after the user equipment has been handed over to the target cell from the source cell.

In a variant, the method may also include determining whether to deconfigure, keep, or modify the list of prepared candidate cells. In addition, the method may include transmitting a reject, accept, or modify message to the user equipment. The message may include instructions based on the determined deconfigure, keep, or modify of the list of prepared candidate cells.

In a variant, the method may also include sending to the source cell an indication that the target cell has instructed the user equipment to deconfigure or modify the list of prepared candidate cells. The source cell may forward the indication to one or more candidate cells in the list of prepared candidate cells. The indication may include an identification of the user equipment.

In another variant, the method may include sending to one or more candidate cells in the prepared candidate cell list an indication that the target cell has instructed the user equipment to remove or modify the list of prepared candidate cells.

In a further variant, the method may include transmitting a request from the network node in the target cell to the source cell. The request may include an instruction for the source cell to transmit the list of prepared candidate cells.

In a fourth embodiment, a method may include preparing a list of candidate cells at a source cell, and sending the list of prepared candidate cells from the source cell to a user equipment. The list of candidate may be transmitted to the target cell after or during handover from the source cell to the target cell.

BRIEF DESCRIPTION OF THE DRAWINGS

For proper understanding of the invention, reference should be made to the accompanying drawings, wherein.

DETAILED DESCRIPTION

In certain embodiments, the user equipment may be configured with report triggering events. For example, the user equipment may report cell measurements when a neighbor cell signal level exceeds that of the serving cell by a specified amount, known as an offset, and a time, known as time to trigger. Handover related communication between the user equipment and the network, however, may fail when the quality of service of the source cell in which the user equipment is located may be degraded. This communication failure may be amplified in high frequency deployment associated with NR technology due to rapid changes in channel quality.

As described in 3GPP R2-168852, handover failures of the user equipment per unit of time at high frequency NR deployments may occur more frequently than failures in LTE. Specifically, handover failure rate of high frequency NR deployment may be around 2-4%, whereas LTE may have a handover failure rate of less than 1%, or even less than 0.1%. Smaller time to trigger values may help to reduce the handover communication failure rate in high frequency NR deployment, but may also cause handover ping-pong rates to increase. A handover ping-pong may occur when a user equipment may be handed over rapidly between different cells, meaning back and forth between cells, for a given period of time until finally settling on a cell. Communication handover failures in high frequency NR deployment may be detrimental to the transmission of measurements reports from the user equipment to the network. 3GPP R2-168852 is hereby incorporated by reference in its entirety.

The handover mechanism may therefore be improved in order to decrease the handover failure rates caused by the poor quality of a link connecting the user equipment to the source cell at the time of handover. Furthermore, with the classical handover, which may be completely based on the network, users equipment may not only suffer too late handovers, but also may suffer too early handovers, and wrong cell handovers. The measurements may be typically reset during the handover, which means that it may take a lot of time until a candidate may be reported, such as the original source, to the target cell. For example, the transmission may take 200 milliseconds (ms) using layer 3 (L3), and over 320 (ms) for take over time, after that the handover procedure is started. Certain embodiments described below may therefore improve the "too early handovers" and wrong cell handovers. In other words, a bad handover decision may be corrected quite fast, if the prepared cells are maintained. Such improvements may be especially important in NR technology or 3GPP fifth generation (5G) technology, which may have stringent requirements for ultra-reliability, low-latency communications (URLLC).

Figure 1:
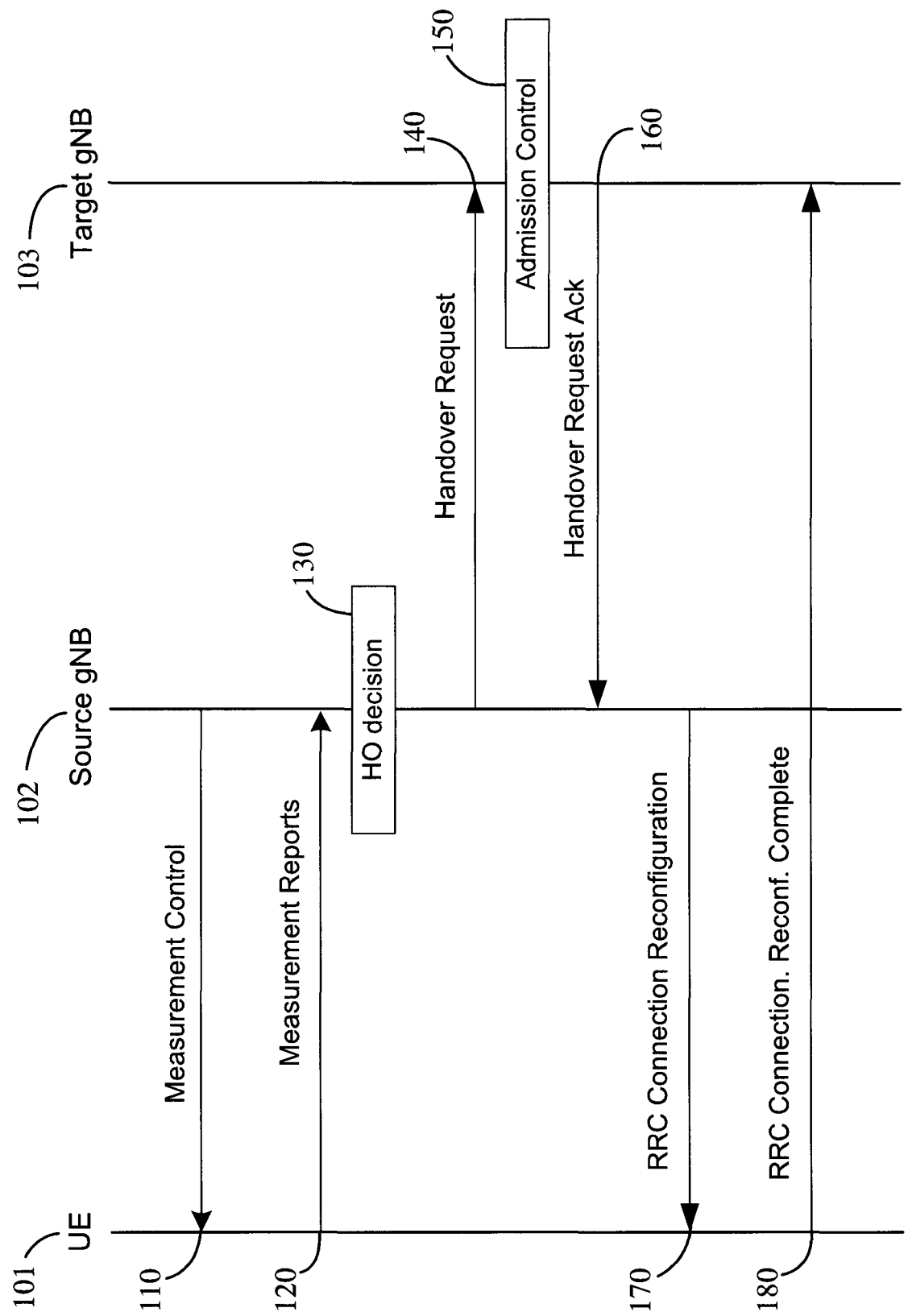
FIG. 1 illustrates an example of a signal flow diagram for a handover to a target cell.

FIG. 1 illustrates an example of a signal flow diagram for a handover to a target cell. In particular, the handover shown in FIG. 1 may be a conventional handover that can be susceptible to handover communication failures. A handover communication failure may be caused when the quality of the link decreases rapidly causing errors in communication. In step 110, the source network node 102, such as a NR NodeB (gNB), may send a measurement control configuration or request to a user equipment (UE) 101. UE 101 may then transmit a measurement report to network node 102, in step 120. Based on the measurement report source network node 102 may then make a handover decision, in step 130. As shown in step 140, the source network node 102 may have decided to hand over UE 101 to a target network node 103, and may send target network node 103 a handover request, in step 140.

In step 150, target network node 103 may perform admission control, and may grant UE 101 access. Target network node 103 may then transmit a handover request acknowledgment to source network node 102, as shown in step 160. In step 170, source network node 102 may send an RRC connection reconfiguration message to UE 101, so that UE 101 may reconfigure itself with target cell parameters. UE 101 may then send target network node 103 an RRC connection reconfiguration complete message, as shown in step 180, which indicated to target network node 103 that UE 101 has been successfully handed over and has accessed the cell in which target network node 103 is located.

As discussed above, the conventional handover shown in FIG. 1 may be susceptible to handover failures, especially in NR or 5G technology when operating in higher frequencies, for example greater than 6 GHz. To prevent or minimize the probability for handover failures, certain embodiments may set the reporting trigger thresholds to a low value, meaning that a small offset may be set. The small offset may trigger measurements reporting while the quality or level of the serving or source cell may still be high. Lowering the threshold value, however, may increase the signaling overhead since the user equipment may generate more measurement reports, thereby utilizing more resources to send measurement reports. In addition, lowering the threshold value may lead to handover failures associated with handing over the user equipment too early, for example, at a time when the target cell may not be at a stable state capable of accepting the handover. This may also increase the occurrence of the handover ping-pong in the network.

In certain other embodiments, the UE may be preconfigured with a list of prepared candidate cells, also referred to herein as a candidate set, for UE autonomous handover. In UE autonomous mobility, also referred to as a conditional handover, the UE can select a cell to which the UE may be handed over based on network configured conditions. Network configured conditions, for example, may be that a given neighboring cell may have a measured signal that may be more powerful than other neighboring cell signals by a preconfigured factor. In certain embodiments involving autonomous UE mobility, the UE may perform configured measurements and eventually meets a given condition, upon which the autonomous mobility procedure initiated by the UE may be triggered towards the candidate cell. For example, the UE may meet an entry criteria of the radio connection upon which the UE may execute the handover. In other words, the UE may be given a handover command which may be executed after the predefined condition may be fulfilled.

Candidate cells may be cells that have been prepared or preconfigured for a UE by the network, or any network node included within the network. As such, the list of prepared candidate cells may also be referred to as a list of prepared candidate cells. In embodiments that include a list of prepared candidate cells, a UE undergoing autonomous or conditional handover may select a cell within the list of prepared candidate cells to which to be handed over. The list of prepared candidate cells may be UE specific, and the selection made by the UE may depend on network configured conditions.

Figure 2:
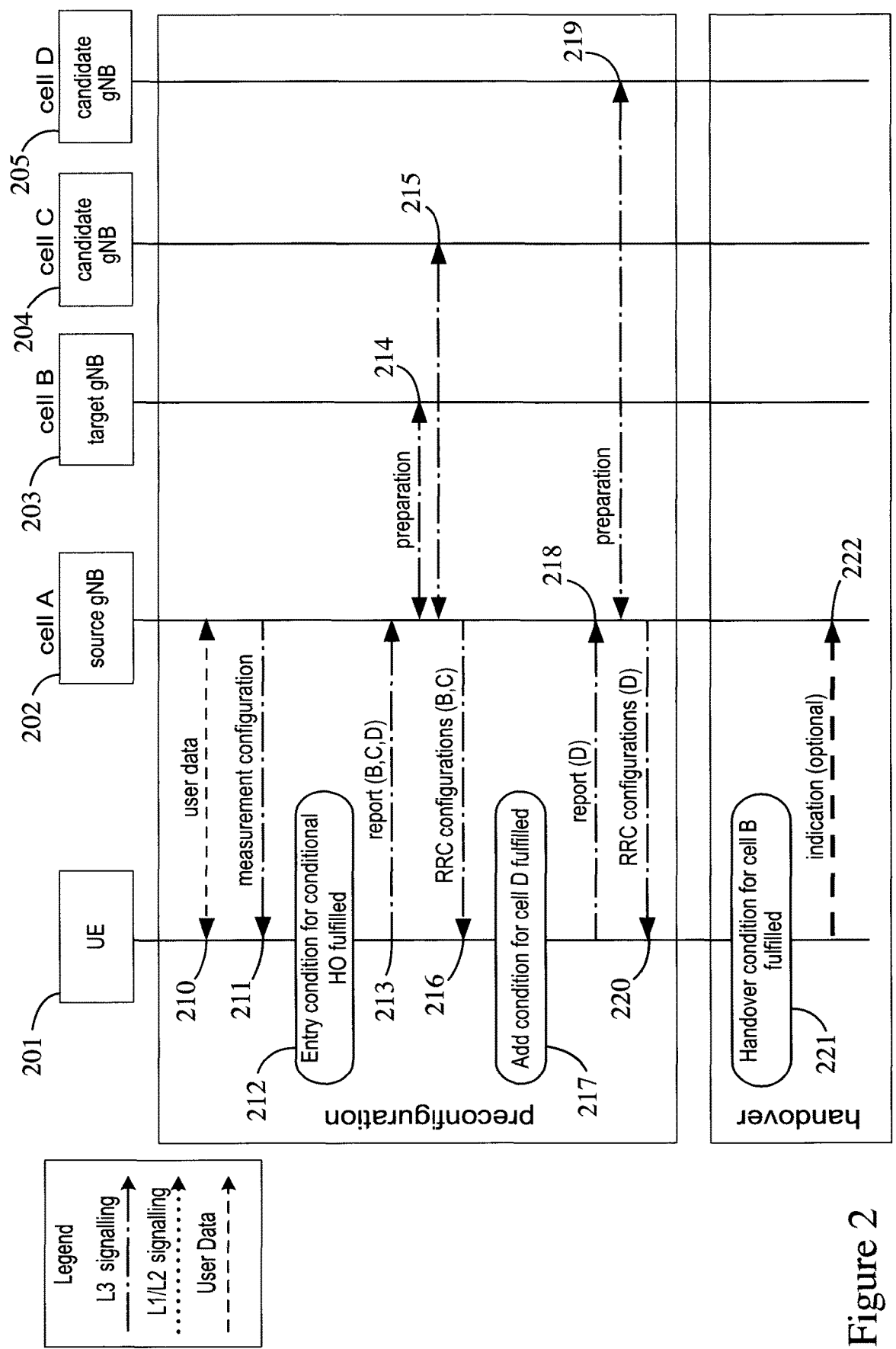
FIG. 2 illustrates an example of a signal flow diagram for a handover with multiple candidate cells.

FIG. 2 illustrates an example of a signal flow diagram for a handover with multiple candidate cells. In particular, FIG. 2 illustrates a signal flow diagram in which the UE, or any other wireless terminal, may undergo a conditional handover and may have access to a list of prepared candidate cells. In step 210, a UE 201 may exchange user data with a source network node 202, for example a gNB, located in cell A. While certain embodiments below may refer to a gNB, any embodiment presented below may instead include any other network node. gNB 202 may then send UE 201 a measurement configuration message, as shown in step 211. In step 212, UE 201 may determine that an entry network configured condition for a conditional handover has been fulfilled. The entry network configured condition may be an initial step in which the UE may determine that a condition has been met to place the UE on alert that a handing over to another cell may soon be warranted. The entry condition may be fulfilled and maintained for a predefined duration of time or time-offset. UE 201 may then report to source gNB 202 that the condition has been fulfilled, in step 213, and may include the list of prepared candidate cells as part of the reporting. In FIG. 2 cell B, cell C, and cell D are included as part of the list of prepared candidate cells. In some other embodiments, the UE may not need to send the list of prepared candidate cells to the source gNB, since the source gNB may have a copy of the list already stored in the memory of the gNB.

In steps 214 and 215, source gNB 202 may send target gNB 203, located in cell B, and candidate gNB 204, located in cell C, preparation messages, which may inform gNB 203 and gNB 204 to prepare for a potential conditional handover of UE 201. As part of the preparation, the gNB 203 and gNB 204 may perform admission control, and grant access to UE 201. gNB 203 and gNB 204 may then transmit a handover request acknowledgment to source gNB 202. In step 216, source gNB 202 may provide UE 201 with an RRC configuration for both cell B and cell C. UE 201 may then determine to which of the cells the UE may prefer to be handed over. The determination may be based on a network configured condition, such as a prepared cell becoming offset better than a current serving cell.

As shown in step 217, UE 201 may determine that an ADD condition for cell D can be fulfilled. In other words, the UE may have certain network configured conditions that when met allow for the UE to add a cell to the list of prepared candidate cells. For example, the condition may be a measurement of a threshold signal quality. In other embodiments, the UE may receive a message ordering the UE to add a given cell to the list of prepared candidate cells. The UE in step 217 may determine that cell D may be added to the list of prepared candidate cells. Steps 218, 219, and 220 in FIG. 2 mimic steps 213, 214/215, and 216, as previously discussed, except that steps 218, 219, and 220 relate to cell D, as opposed to cells B and C.

UE 201 in step 221 may then determine that a handover condition for cell B has been fulfilled. The handover condition may be a network configured condition that has been preconfigured into the memory of the UE by the network. Specifically, the handover condition may be a measured signal of the target cell or another neighboring cell being more powerful than another measured signal of the source cell by a preconfigured factor. UE 201 may then perform autonomous/conditional handover directly to target gNB 203, without the involvement of source gNB 202 because the handover to cell B has already been prepared in steps 213, 214, and 216. In certain embodiments, before handover UE 201 may optionally inform or indicate to source gNB 202 that the handover condition to cell B has been fulfilled, and that UE 201 may be hand over to cell B. In some embodiments in which the UE handover may be conditional, UE 201 may inform the source gNB 202 of the network configured condition met by target cell B.

As can be seen in FIG. 2, the UE candidate set and related signaling may be managed by the source cell. Once the UE undergoes network controlled, autonomous, or conditional handover to a target cell, it may be unclear how to improve upcoming handovers by decreasing handover frequency, after the handover to the target cell. In certain embodiments, improving signaling may be done by managing the candidate set efficiently, to avoid delays. Certain embodiments, therefore, help to address the above by allowing an indication of the list of prepared candidate cells to be sent to a network node in a target cell upon the handover of the UE to the target cell. Certain embodiments may also help to avoid delays due to the pre-configuration phase in the target cell. The indication of the prepared candidate cells may be initiated either by the UE or the network.

In certain embodiments, the UE may initially undergo a handover to a target cell, also referred to as a new cell. The handover may be a conditional/autonomous handover, in which the UE initiates the handover, or a network controlled handover, in which a network command may initiate the handover. After accessing the new cell, the UE may transmit to a network node in the target cell, a list of the prepared candidate cells. The list, for example, may include cell identifications, UE identities for the candidate cells, such as a temporary cell radio network temporary identifier (C-RNTI), and/or the latest measurements that the UE may have stored relating to the candidate cells. The measurements, for example, may be link quality measurements and/or an amount of time lapsed after the preparation of the cell for handover.

The list of prepared candidate cells may be transmitted to the network node in the target cell via the RRC reconfiguration complete message, which may be sent from the UE to the network node, upon being handed over to the new cell. In other embodiments, the list of prepared candidate cells may be transmitted from the UE to the network node in the new cell via a dedicated RRC message. The RRC message may be sent at any time after the UE handover.

In response to receiving the list of prepared candidate cells, the target cell may send a candidate cell list configuration message in which the target cell may reject, accept, and/or modify the list of prepared candidate cells. When the target cell sends the UE a reject message, the UE may in response deconfigure one or more cells from the list of prepared candidate cells. In other words, the UE may remove one or more cells from the list of prepared candidate cells. In addition, in certain embodiments, the reject message may include instructions to deconfigure/remove or modify the network configured handover condition used by the UE for either autonomous or conditional handover.

In some embodiments, in response to receiving the list of prepared candidate cells, the target cell may accept the list of prepared candidate cells. The target cell may then send the UE an accept message, in response to which the UE may continue to use the current list of prepared candidate cells. The accept message, however, may include instructions for modifying the network configured handover condition used by the UE for either autonomous or conditional handover, or the accept message may include instructions on the conditions for how the UE reports/considers potential cells to be candidates.

The target cell may in certain embodiments send the UE a modify message after receiving the list of prepared candidate cells. The modify message may include an instruction for the UE to modify the list of prepared candidate cells by removing and/or adding specific, individual cells within the list of prepared candidate cells. The specific cells added to the list of prepared candidate cells, for example, may be cells that the target cell deems to be potential candidates, even though the UE may not have any measurements on such added cells. Similar to the reject and accept messages, the modify message may also include instructions for modifying the network configured handover condition used by the UE for either autonomous or conditional handover.

In certain embodiments, the source cell may indicate to the UE whether the UE may be allowed to add the source cell to the list of prepared candidate cells. The source cell may send an indication to the UE indicating that the UE may continue to use or maintain the current configuration of the list of prepared candidate cells when the conditional handover is triggered. In certain embodiments, the source cell may request the UE to flush the configuration when performing handover. In some other embodiments, the source cell may indicate to the UE an alternative configuration of the list of prepared candidate cells. The alternative configuration may, for example, have the source cell included/added within the list of prepared candidate cell. When network controlled handover is triggered the source cell may include the alternative configuration of the list of prepared candidate cells to the UE as part of the handover command. The UE may inform the target cell, upon or after accessing the target cell, that the source cell may be included as part of the list of prepared candidate cells.

In embodiments in which the target cell may either reject or modify the list of prepared candidate cells, the target cell may contact the affected cells in the candidate set to remove and/or modify their reservations or allocations for the UE. In other words, if the target cell determines that cell C should be removed from the list of prepared candidate cells, the target cell may send a signal informing cell C that the cell has been removed from the list of prepared candidate cells for the specific UE. Cell C may then remove any reservations or allocation of resources it may have dedicated towards the specific UE in preparation for a potential handover.

The signaling from the target cell to the cell whose been affected by either the rejection or modification of the list of prepared candidate cells may be directly signaled or indirectly signaled, for example, through the source cell. In certain embodiments, direct signaling may not be feasible since an interface may not exist between the cells to allow for such direct communication. When sending indirectly, therefore, it may be helpful for the target cell, in some embodiments, to include a UE identity so that the affected cell receiving the message may properly identify the specific UE. For example, the target cell may use the temporary UE identifier, such as a temporary C-RNTI, created by the affected cell during preparation for the potential handover of the UE.

In certain embodiments, the network, rather than the UE, may initiate the transmission of the list of prepared candidate cells to the target cell. The source cell may manage the sending of information associated with the list of prepared candidate cells to cells in the network. For example, when a new cell is added or removed from the list of candidate cells, the source cell may inform the cells in the list of prepared candidate cells of the modification to the list. In some embodiments, when the UE is handed over to the target cell, the target cell may begin to manage the list of prepared candidate cells. For example, the target cell may have information relating to other candidate cells. The target cell may then determine a candidate set management action, such as adding a cell to the list of prepared candidate cells. If the added cell meets a network configured condition, the UE may be handed over to the newly added cell.

In some embodiments, after the handover of the UE to the target cell, the target cell may request the list of prepared candidate cells from the source cell. In other embodiments, the UE may indicate the handover to the source cell, and the source may initiate a push and transmit the list of candidate cells to the target cell.

Figure 3:
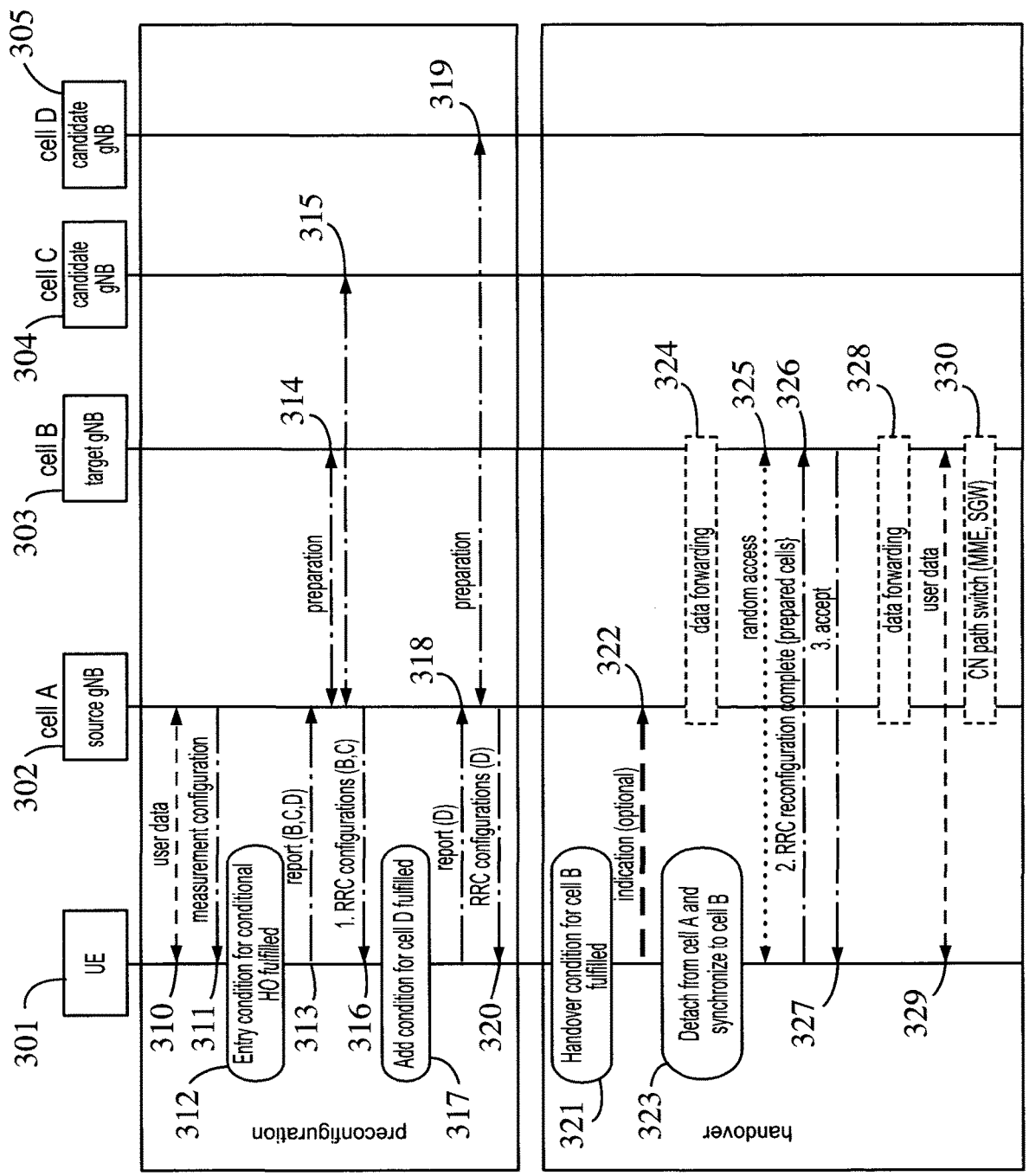
FIG. 3 illustrates an example of a signal flow diagram for a handover according to certain embodiments.

FIG. 3 illustrates an example of a signal flow diagram for a handover according to certain embodiments. In particular, FIG. 3 illustrates an example of a UE initiated indication in which the source cell may be added on to the list of prepared candidate cells. FIG. 3 illustrates a communication system that includes UE 301, source gNB 302 located in cell A, target gNB 303 located in cell B, candidate gNB 304 located in cell C, and candidate gNB 305 located in cell D. Steps 310 through 322 in FIG. 3 mimic steps 210 through 222 in FIG. 2. As such, a description of steps 310 through 322 can be found in the discussion of FIG. 2.

In the pre-configuration phase shown in FIG. 3, candidate cells B, C, and D may be prepared by the UE. In the RRC configuration message sent from source gNB 302 to UE 301, gNB 302 may indicate that the UE may use the current configuration of the list of prepared candidate cells once a conditional handover may be triggered. When the UE determines that the handover condition for cell B may be fulfilled, as shown in step 321, the UE may detach from cell A, in which source gNB 302 may be located, and synchronize with gNB 303 located in cell B. In step 324 the source gNB 302 may forward data to target gNB 303, and random access may be established between UE 301 and target gNB 303 in cell B, as shown in step 325.

In step 326, UE 301 may send an RRC reconfiguration complete message to target gNB 303. The RRC configuration complete message may include a list of prepared candidate cells. The list of prepared candidate cells may include, for example, a cell identification, time elapsed since preparation by each candidate cell, last link quality measurement for each candidate, and/or a UE identity that was used when preparing the candidate cells, such as a temporary C-RNTI or C-RNTI. In addition, in certain embodiments that UE may also include as part of the RRC configuration complete message an indication that the source cell may be included as part of the list of prepared candidate cells. In step 327, target gNB 303 may send UE 301 an indication that the RRC configuration complete was accepted. In step 328, source gNB 328 may again forward data to target gNB 303, if needed. User data may then be exchanged between UE 301 and target gNB 303, as shown in step 329. Finally, a core network path switch, that may include for example a serving gateway (SGW) and/or a mobility management entity (MME), may be conducted between source gNB 302 and target eNB 303, as shown in step 330.

Figure 4:
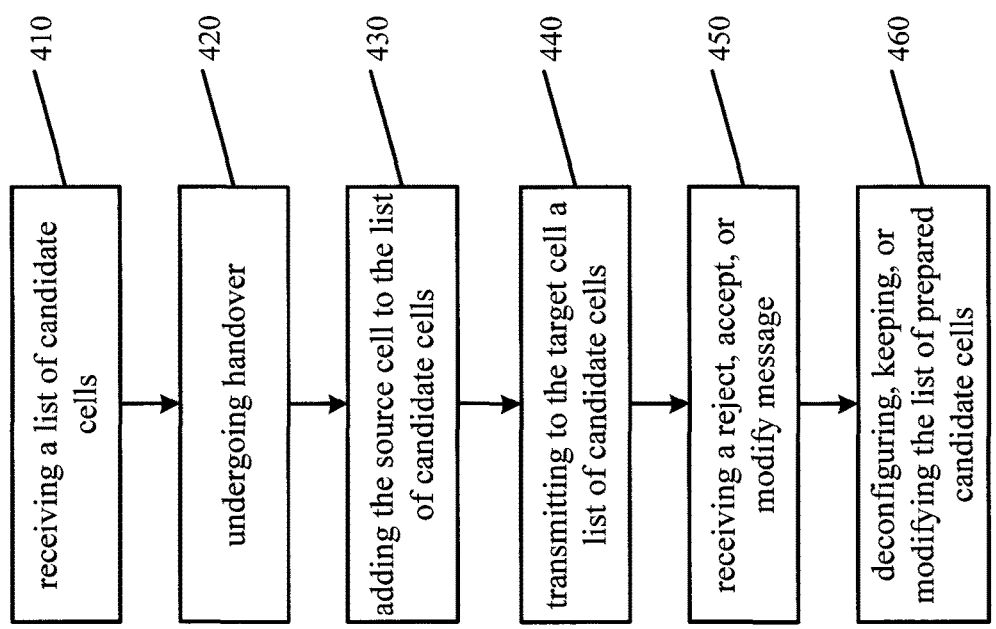
FIG. 4 illustrates an example of a method according to certain embodiments.

FIG. 4 may illustrate an example of a method according to certain embodiments. In particular, FIG. 4 illustrates a method or process performed by a UE. In step 410, the UE may receive a list of prepared candidate cells from a source cell. In step 420, the UE may undergo a handover from a source cell to a target cell. The handover may be triggered upon receiving of a network handover command or upon meeting a network configured condition. The UE may receive a message from the source cell, where the message indicates to the user equipment whether the source cell may be added to the list of prepared candidate cells. In step 430, the UE may add the source cell to the list of prepared candidate cells based on the received message from the source cell. In other words, a source cell, or a network node within the source cell, may send a list of prepared candidate cells from a source cell to a user equipment. In certain embodiments, the list of candidate may be transmitted to the target cell after or during handover of the user equipment from the source cell to the target cell, as shown in step 440. A message may be transmitted from the source cell to the user equipment, where the message indicates to the user equipment that the source cell is to be added to the list of prepared candidate cells.

In step 440, the UE may transmit to a network node in the target cell the list of prepared candidate cells during or after being handed over. In other embodiments, the network node at the target cell may receive the list of prepared candidate cells from the source cell, rather than the user equipment. The list of prepared candidate cells may include at least one of cell identification, user equipment identity for the candidate, or latest measurements associated with the candidate cells. In response to transmitting the list of prepared candidate cells, the UE may receive a reject, accept, or modify message from the network node in the target cell after handover relating to the list of prepared candidate cells associated with the user equipment, as shown in step 450. In step 460, the UE may deconfigure, keep, and/or modify the list of prepared candidate cells depending on the received message from the network node at the user equipment.

Figure 5:
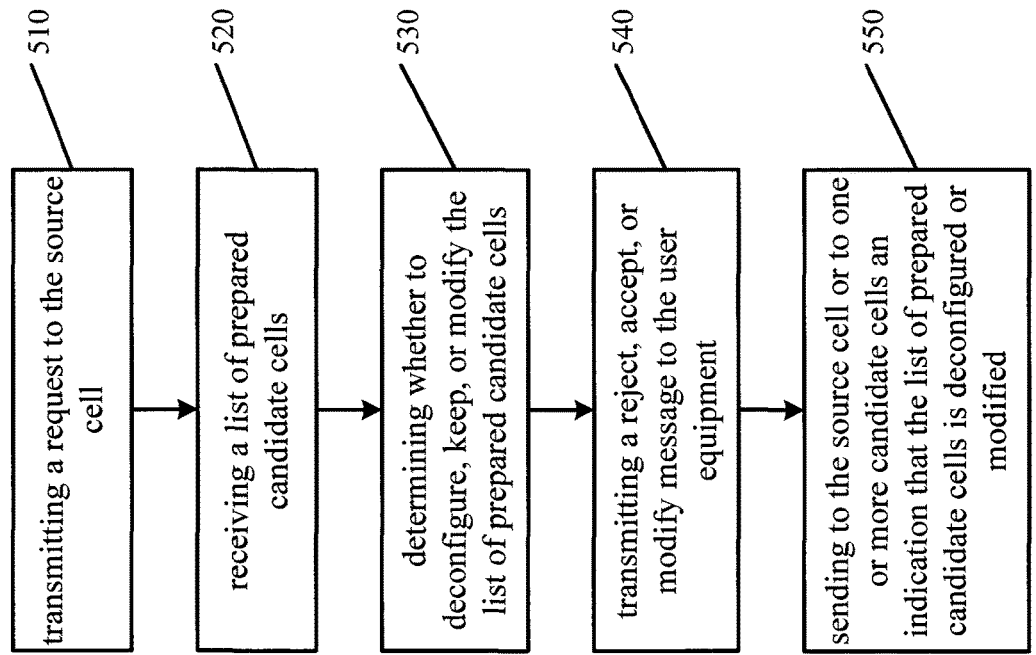
FIG. 5 illustrates an example of a method according to certain embodiments.

FIG. 5 may illustrate an example of a method according to certain embodiments. In particular, FIG. 5 illustrates a method or process performed by the network node in the target cell, such as a gNB. In some embodiments, the network node may transmit a request from the network node in the target cell to the source cell, as shown in step 510. The request may comprise an instruction for the source cell to transmit the list of prepared candidate cells. In step 520, the network node in the target cell may receive from a UE or a source network node the list of prepared candidate cells after the UE has been handed over to the target cell from the source cell. Therefore, in some embodiments the list of prepared candidate cells may be received from the source cell, while in other embodiments the list may be received from the UE.

In step 530, the network node may determine whether to deconfigure, keep, or modify the list of prepared candidate cells. In step 540, the network node may transmit a reject, accept, or modify message to the UE. The message may include instructions based on the determined deconfigure, keep, or modify of the list of prepared candidate cells. In step 550, the network node may send to the source cell an indication that the target cell has instructed the user equipment to deconfigure or modify the list of prepared candidate cells. In other words, the source cell may receive an indication that the target cell has instructed the user equipment to deconfigure or modify the list of prepared candidate cells. The source cell may send or forward the indication to one or more candidate cells in the list of prepared candidate cells. The indication may also include an identification of the user equipment. In other embodiments, the network node may directly send the indication to one or more candidate cells in the candidate cell list.

Figure 6:
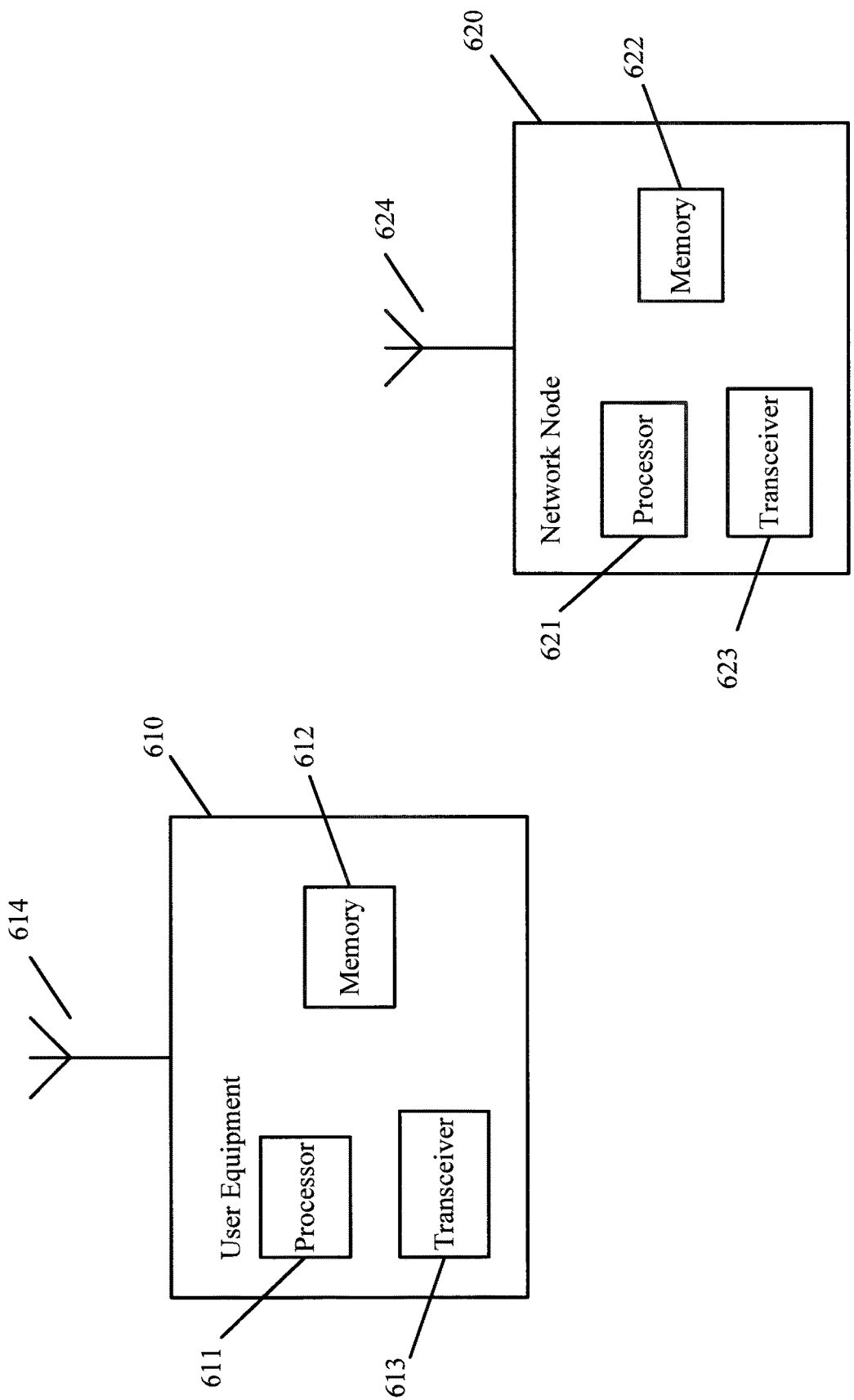
FIG. 6 illustrates an example of a system according to certain embodiments.

FIG. 6 illustrates a system according to certain embodiments. It should be understood that each signal or block in FIGS. 1-5 may be implemented by various means or their combinations, such as hardware, software, firmware, one or more processors and/or circuitry. In one embodiment, a system may include several devices, such as, for example, network node 620 or UE 610. The system may include more than one UE 610 and more than one network node 620. Network node 620 may be a base station, an access point, an access node, a gNB, a evolved NodeB (eNB), a server, a host, or any other network entity that may communicate with the UE.

Each of these devices may include at least one processor or control unit or module, respectively indicated as 611 and 621. At least one memory may be provided in each device, and indicated as 612 and 622, respectively. The memory may include computer program instructions or computer code contained therein. One or more transceiver 613 and 623 may be provided, and each device may also include an antenna, respectively illustrated as 614 and 624. Although only one antenna each is shown, many antennas and multiple antenna elements may be provided to each of the devices. Other configurations of these devices, for example, may be provided. For example, network node 620 and UE 610 may be additionally configured for wired communication, in addition to wireless communication, and in such a case antennas 614 and 624 may illustrate any form of communication hardware, without being limited to merely an antenna.

Transceivers 613 and 623 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or UE 610 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a user equipment or a network node, may include means for performing or carrying out embodiments described above in relation to FIGS. 1-5. In certain embodiments, the apparatus may comprise at least one processor and at least one memory including computer program code. The at least one memory including computer program code can be configured to, with the at least one processor, cause the apparatus at least to perform any of the processes described herein.

Processors 611 and 621 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 620 or UE 610, to perform any of the processes described above (see, for example, FIGS. 1-5). Therefore, in certain embodiments, a non-transitory computer-readable medium may be encoded with instructions or one or more computer program (such as added or updated software routine, applet or macro) that, when executed in hardware, may perform a process such as one of the processes described herein. In other embodiments, a computer program product may encode instructions for performing any of the processes described above, or a computer program product embodied in a non-transitory computer-readable medium and encoding instructions that, when executed in hardware, perform any of the processes describes above. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1-5. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Specific examples of circuitry may be content coding circuitry, content decoding circuitry, processing circuitry, image generation circuitry, data analysis circuitry, or discrete circuitry. The term circuitry may also be, for example, a baseband integrated circuit or processor integrated circuit for a mobile device, a network entity, or a similar integrated circuit in server, a cellular network device, or other computing or network device.

Furthermore, although FIG. 6 illustrates a system including a network node 620 and UE 610, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 610 may likewise be provided with a variety of configurations for communication other than communicating with network node 620. For example, the UE 610 may be configured for device-to-device, machine-to-machine, or vehicle-to-vehicle communication.

The above embodiments provide for significant improvements to the functioning of a network and/or to the functioning of the network entities within the network, or the user equipment communicating with the network. For example, the above embodiments may allow for the maintaining and modifying of the candidate cell set during or following a UE autonomous handover. In addition, certain embodiments may reduce signaling overhead when the UE returns to the source cell or when the UE continues to another candidate cell. The embodiments also help to facilitate a faster return to the source cell upon sensing of a ping-pong handover, for example too early handover to a target cell, and help to avoid delays due to the pre-configuration phase in the target cell. The specific information included within the list of prepared candidate cells may act to finely tune or adjust the network configured conditions when cells may be added in the future. For example, a large time lapse may indicate that that a given candidate cell may have been added too early.

In addition to the single connectivity downlink reference symbol UE autonomous handover described in some of the embodiments, the above embodiments may be compatible with the following enhancements considered for NR technology. For example, uplink signal based mobility, sometimes referred to as uplink mobility, may be a mobility concept where mobility related procedures are based on network measurement of UE transmitted uplink reference signals such as sounding reference signal (SRS), in which the UE measurements reports in the preconfiguration or deconfiguration phase may be replaced by configuring an uplink reference signal to be transmitted by the UE, and which is detected by the candidate cells. Certain embodiments may also apply in intra-frequency, make-before-break handover based on dual connectivity procedures. In such embodiments, the candidate cells may be considered as prepared secondary cells that the UE may access autonomously as part of the make-before-break handover. Some other embodiments may apply to inter central unit handovers involving cloud RAN utilizing a central unit or distributed unit technology with higher layer protocol splits.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to New Radio technology, the above embodiments may apply to any other 3GPP technology, such as IoT technology, LTE, LTE-advanced, fourth generation (4G) technology, and/or 5G technology.

Partial Glossary

3GPP third generation partnership project
LTE long term evolution
gNB new radio NodeB
NR new radio
RRC radio resource control
RAN radio access network
5G fifth generation
UE user equipment
C-RNTI cell radio network temporary identifiers

We claim:

1. A user equipment comprising:
at least one processor; and
at least one memory including computer program code,
wherein the at least one memory and the computer program code are configured to, with the at least one processor, cause the user equipment at least to:
receive a list of prepared candidate cells from a source cell, the prepared candidate cells being candidate cells from among which the user equipment can select a target cell for a user equipment autonomous handover from the source cell; and
transmit the list of prepared candidate cells to the target cell after or during a handover from the source cell to the target cell.

2. The user equipment of claim 1, wherein the at least one memory and the computer program code are further configured to, with the at least one processor, cause the user equipment at least to:
Receive a reject, accept, or modify message from a network node in the target cell after the handover relating to the list of prepared candidate cells associated with the user equipment.

3. The user equipment of claim 2, wherein the rejection message includes instructions for removal of at least one handover condition for a conditional handover.

4. The user equipment of claim 3, wherein the at least one handover condition comprises a measured signal of the target cell or another neighboring cell being more powerful than another measured signal of the source cell by a preconfigured factor.

5. The user equipment of claim 2, wherein
When the user equipment receives the accept message from the network node, the user equipment continues using the list of prepared candidate cell and/or
When the user equipment receives the modify message from the network node, the user equipment modifies the list of prepared candidate cells based on the received modify message by at least one of removing or adding a cell to the list of prepared candidate cells.

6. The user equipment of claim 2, wherein at least one of the accept, reject, or modify message includes instructions for modification of at least one handover condition for autonomous handover.

7. The user equipment of claim 2, wherein the at least one memory and the computer program code are further configured to, with the at least one processor, cause the user equipment at least to:
deconfigure, keep or modify the list of prepared candidate cells depending on the received message from the network node.

8. The user equipment of claim 2, wherein when the user equipment receives the rejection message from the network node, the user equipment deconfigures one or more cells from the list of prepared candidate cells.

9. The user equipment of claim 1, wherein the handover of the user equipment is triggered upon reception of a network handover command from the source cell and/or upon meeting a network configured condition in case of autonomous handover.

10. The user equipment of claim 1, wherein the transmission of the list of prepared candidate cells is included as a part of handover signaling.

11. The user equipment of claim 1, wherein the list of prepared candidate cells includes at least one of cell identification, user equipment identity for the candidate, or latest measurements associated with the candidate cells.

12. The user equipment of claim 1, wherein the list of prepared candidate cells is transmitted in a dedicated radio resource control message or a radio resource control reconfiguration complete message.

13. The user equipment of claim 1, wherein the at least one memory and the computer program code are further configured to, with the at least one processor, cause the user equipment at least to:
receive a message from the source cell, wherein the message indicates to the user equipment that the source cell is to be added to the list of prepared candidate cells; and
add the source cell to the list of prepared candidate cells.

14. An apparatus comprising:
at least one processor; and
at least one memory including computer program code,
wherein the at least one memory and the computer program code are configured to, with the at least one processor, cause the apparatus at least to
receive at the apparatus in a target cell from a user equipment or a source network node a list of prepared candidate cells after the user equipment has been handed over to the target cell from a source cell,
wherein the prepared candidate cells are candidate cells from among which the user equipment can select the target cell for a user equipment autonomous handover from the source cell.

15. The apparatus of claim 14, wherein the at least one memory and the computer program code are further configured to, with the at least one processor, cause the apparatus at least to determine whether to deconfigure, keep, or modify the list of prepared candidate cells; and transmit a reject, accept, or modify message to the user equipment, wherein the message includes instructions based on the determined deconfigure, keep or modify of the list of prepared candidate cells.

16. The apparatus of claim 15, wherein the at least one memory and the computer program code are further configured to, with the at least one processor, cause the apparatus at least to send to one or more candidate cells in the prepared candidate cell list an indication that the target cell has instructed the user equipment to remove or modify the list of prepared candidate cells.

17. The apparatus of claim 15, wherein the at least one memory and the computer program code are further configured to, with the at least one processor, cause the apparatus at least to transmit a request from the network node in the target cell to the source cell, wherein the request includes an instruction for the source cell to transmit the list of prepared candidate cells.

18. The apparatus of claim 14, wherein the at least one memory and the computer program code are further configured to, with the at least one processor, cause the apparatus at least to send to the source cell as indication that the target cell has instructed the user equipment to deconfigure or modify the list of prepared candidate cells.

19. The apparatus of claim 18, wherein the indication includes an identification of the user equipment.

20. A method comprising:

receiving at a user equipment a list of prepared candidate cells from a source cell, the prepared candidate cells being candidate cells from among which the user equipment can select a target cell for a user equipment autonomous handover from the source cell; and transmitting the list of prepared candidate cells from the user equipment to the target cell after or during handover from the source cell to the target cell.

* * * * *